United States Patent
Kusuma et al.

(10) Patent No.: US 10,354,538 B2
(45) Date of Patent: Jul. 16, 2019

(54) EFFICIENT TIME SLOT ALLOCATION FOR A FLIGHT PLAN OF AN AIRCRAFT

(71) Applicant: HONEYWELL INTERNATIONAL INC., Morris Plains, NJ (US)

(72) Inventors: Murali Krishna Kusuma, Andhra Pradesh (IN); Amit Srivastav, Karnataka (IN); Mahender Rangu, Telangana (IN); Chinmayee Agnihotri, Andhra Pradesh (IN)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 15/710,656

(22) Filed: Sep. 20, 2017

(65) Prior Publication Data

US 2019/0088147 A1 Mar. 21, 2019

(51) Int. Cl.
  *G08G 5/00* (2006.01)
  *G08G 5/06* (2006.01)
  *H04B 7/185* (2006.01)

(52) U.S. Cl.
  CPC ............ *G08G 5/065* (2013.01); *G08G 5/003* (2013.01); *G08G 5/0013* (2013.01);
  (Continued)

(58) Field of Classification Search
  CPC ...... G08G 5/065; G08G 5/003; G08G 5/0043; H04B 7/18506; G06Q 10/06
  See application file for complete search history.

(56) References Cited

U.S. PATENT DOCUMENTS 6,282,487 B1  8/2001  Shiomi et al.
6,584,400 B2 *  6/2003  Beardsworth ........ G08G 5/0043
                                          701/120
(Continued)

FOREIGN PATENT DOCUMENTS

CN       101527086 A      9/2009
WO   WO 2018/224693      * 12/2018

OTHER PUBLICATIONS

Simaiakis et al.; Dynamic Control of Airport Departures: Algorithm Development and Field Evaluation; Feb. 2014; IEEE Trans. on Intelligent Transportation Systems, vol. 15, No. 1; pp. 285-295 (Year: 2014).*

(Continued)

*Primary Examiner* — Michael J Zanelli
(74) *Attorney, Agent, or Firm* — Lorenz & Kopf, LLP (57) ABSTRACT

A system and method for determining an optimum flight slot for an aircraft are provided. The method, for example, may include, but is not limited to, receiving flight plan input data from a client device, generating a flight plan based upon the flight plan input data, the flight plan including a plurality of fixes, determining a plurality of time slots based upon the flight plan input data, determining a traffic density for each fix along the flight plan for each of the plurality of slots, the traffic density based upon a number of aircraft within a bounding area containing each respective fix, determining the optimum flight time slot from the plurality of time slots based upon a weighted summation of the traffic density for each fix along the flight plan for each of the plurality of slots, and transmitting the optimum flight time slot to the client device.

16 Claims, 6 Drawing Sheets

(52) U.S. Cl.
CPC ......... *G08G 5/0034* (2013.01); *G08G 5/0043* (2013.01); *G08G 5/0082* (2013.01); *H04B 7/18506* (2013.01)

(56) References Cited

U.S. PATENT DOCUMENTS

| | | |
|---|---|---|
| 8,554,457 B2 | 10/2013 | White et al. |
| 2002/0002548 A1 | 1/2002 | Roundtree |
| 2014/0039783 A1 | 2/2014 | White et al. |
| 2014/0343833 A1 | 11/2014 | Baiada et al. |
| 2016/0055275 A1 | 2/2016 | Wang et al. |
| 2016/0063868 A1 | 3/2016 | White et al. |
| 2016/0210868 A1* | 7/2016 | Donovan ............. G08G 5/0043 |
| 2016/0343259 A1 | 11/2016 | Ince et al. |
| 2017/0061333 A1* | 3/2017 | Endres ................... G06Q 10/02 |

OTHER PUBLICATIONS

Zelinski; A Framework for Integrating Arrival, Departure, and Surface Operations Scheduling; 2014 IEEE/AIAA 33rd Digital Avionics Systems Conf. (DASC), Colorado Springs, Co; pp. 1A1-1-1A1-17. (Year: 2014).*

Srivastava, A.; Improving Departure Taxi Time Predictions Using ASDE-X Surveillance Data; The MITRE Corporation Center for Advanced Aviation System Development; 2011 The IEEE.

European Patent and Trademark Office, European Extended Search Report for Application No. EP18193316.9 dated Mar. 13, 2019.

\* cited by examiner

EFFICIENT TIME SLOT ALLOCATION FOR A FLIGHT PLAN OF AN AIRCRAFT

TECHNICAL FIELD

The present disclosure generally relates to an aircraft, and more particularly relates to systems and methods for determining when an aircraft should optimally depart.

BACKGROUND

Fuel for an aircraft is one of the more expensive operating costs for an airline. In certain situations, an aircraft needlessly wastes fuel. For example, when an aircraft is in a long queue to take off or when there isn't a gate available for the aircraft after the aircraft lands.

BRIEF SUMMARY

In one embodiment, for example, a system for determining an optimum flight time slot for a target aircraft is provided. The system may include, but is not limited to, a communication system, a processor communicatively connected to the communication system, the processor configured to receive scheduled flight plan data and real time position data for other aircraft, receive surface operation position data for other aircraft and ground operation vehicles at a departure airport of the target aircraft and surface operation position data for other aircraft and ground operation vehicles at an arrival airport of the target aircraft, receive weather forecast data, receive a proposed flight time, determine a flight plan for the target aircraft, determine a plurality of flight time slots for the target aircraft based upon the proposed flight time, determine, for each of the plurality of flight times slots, an estimated traffic density for the respective time slot based upon a number of aircraft expected to be within a first bounding area defined by an area around a first merging point near the departure airport according to the received flight plan data and real time position data and a first weight assigned to the first merging point, and a number of aircraft expected to be within a second bounding area defined by an area around a second merging point near the arrival airport according to the received flight plan data and real time position data and a second weight assigned to the second merging point, and determine an optimal one of the plurality of flight time slots based upon the determined traffic density for each of the plurality of time slots.

In another embodiment, for example, a method for determining an optimum flight slot for a flight of an aircraft is provided. The method may include, but is not limited to, receiving, by a processor, flight plan input data from a client device, generating, by the processor, a flight plan based upon the flight plan input data, the flight plan including a plurality of fixes along the flight plan, determining, by the processor, a plurality of time slots based upon the flight plan input data, determining, by the processor, a traffic density for each fix along the flight plan for each of the plurality of slots, the traffic density based upon a number of aircraft within a bounding area containing each respective fix, determining, by the processor, the optimum flight time slot from the plurality of time slots based upon a weighted summation of the traffic density for each fix along the flight plan for each of the plurality of slots, and transmitting, by the processor, the optimum flight time slot to the client device.

BRIEF DESCRIPTION OF THE DRAWINGS

The detailed description will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

In accordance with an embodiment, a system and method for determining an efficient departure time slot for an aircraft is provided. The system and method accurately predict traffic density throughout the flight path of the aircraft thereby allowing the system to choose a time slot which will most likely encounter the fewest delays.

Figure 1:
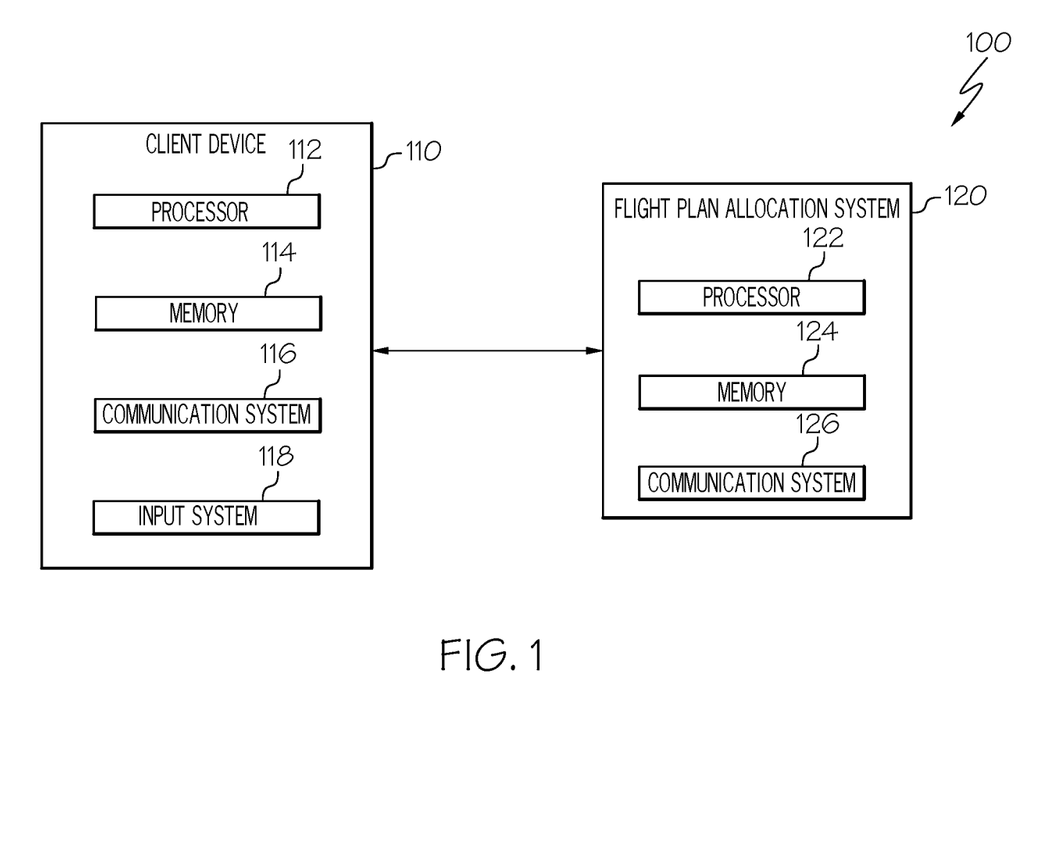
FIG. 1 is a block diagram of a system for determining an efficient time slot for an aircraft, in accordance with an embodiment.

FIG. 1 is a block diagram of a system 100 for determining an efficient time slot for an aircraft, in accordance with an embodiment. The system 100 includes a client device 110 and a flight plan allocation system 120. The client device 110 transmits parameters for a flight of an aircraft to the flight plan allocation system 120. As discussed in further detail below, the flight plan allocation system 120 processes the parameters for a flight and returns the optimal time slot for the flight.

The client device 110 includes at least one processor 112, a memory 114, a communication system 116, and an input system 118. The processor 112 may be a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 114 is coupled to the processor 112 via a communications bus and may include any combination of volatile and non-volatile memory. In one embodiment, for example, a portion of or the entirety of the memory 114 may be a cloud based memory located remotely from the client device 110. In this embodiment, the processor 112 may exchange data with the memory 114 via the communication system 116. The communication system 116 may communicate over one or more communication protocols, including, but not limited to, cellular communications, satellite communications, Wi-Fi communications, or any other wired or wireless communication protocol, or any combination thereof. The input system 118 may include, for example, a keyboard, a mouse, a display, a touch screen, a trackball, voice recognition, or any other input device, or any combination thereof.

The memory 114 may store non-transitory computer readable instructions for implementing a flight plan user interface, as discussed in further detail below. The flight plan user interface may be implemented, for example, as a mobile application (i.e., executable on a mobile device such as a cellular phone, a laptop computer, a tablet computer, or the like), or a web application. The flight plan user interface of the client device 110 may be operated by pilot or an Airline Operation Center (AOC)/Flight Operation Center (FOC) who may create a flight plan on behalf of the pilot.

The flight plan allocation system 120 includes at least one processor 122, a memory 124, and a communication system 126. The processor 122 may be a central processing unit (CPU), a physics processing unit (PPU), a graphics processing unit (GPU), a field programmable gate array (FPGA), an application specific integrated circuit (ASIC), a microcontroller, or any other logic unit or combination thereof. The memory 124 is coupled to the processor 122 via a communications bus and may include any combination of volatile and non-volatile memory. In one embodiment, for example, a portion of, or the entirety of, the memory 124 may be a cloud based memory located remotely from the flight plan allocation system 120. In this embodiment, the processor 122 may exchange data with the memory 124 via the communication system 126. The memory 124 may store non-transitory computer readable instructions for implementing a four dimensional trajectory flight plan manager, as discussed in further detail below. The communication system 126 may communicate over one or more communication protocols, including, but not limited to, cellular communications, satellite communications, Wi-Fi communications, or any other wired or wireless communication protocol, or any combination thereof.

Figure 2:
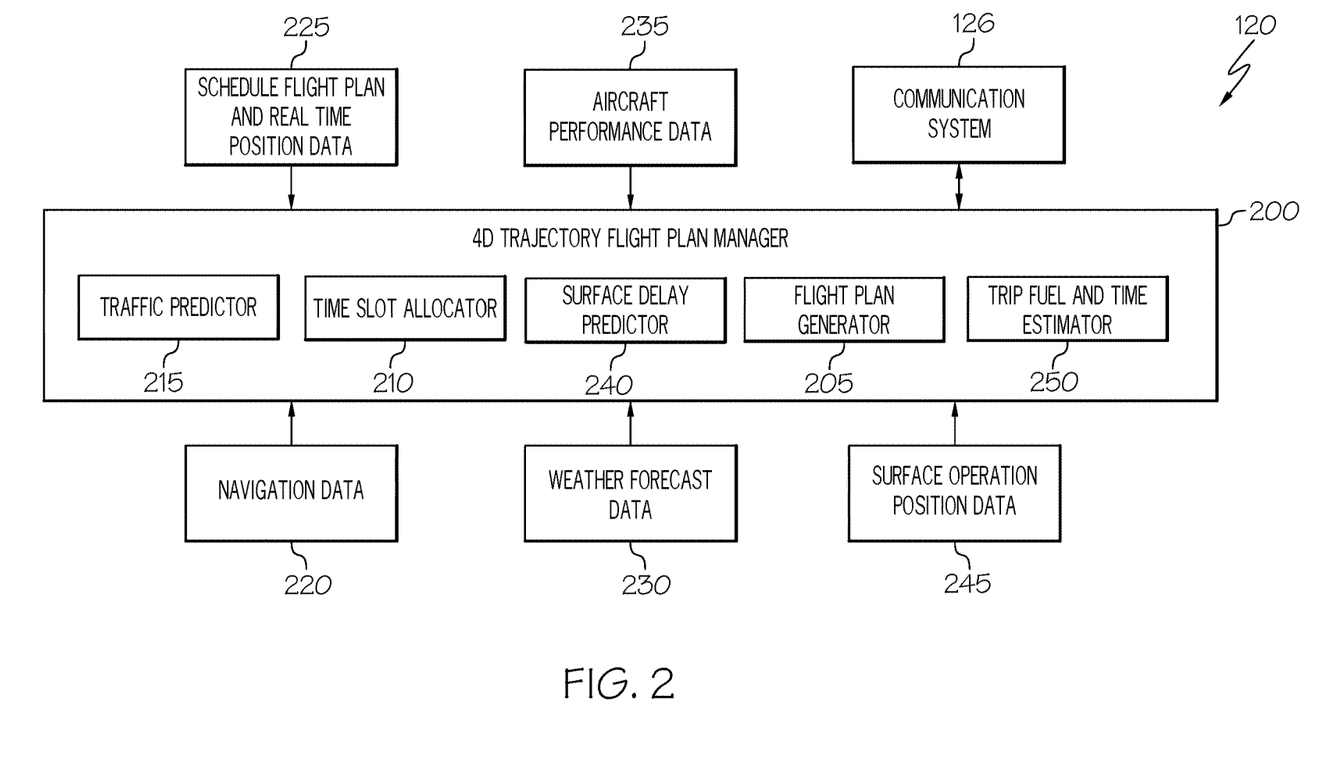
FIG. 2 is a block diagram showing more detail of a flight plan allocation system, in accordance with an embodiment.

FIG. 2 is a block diagram showing more detail of a flight plan allocation system 120, in accordance with an embodiment. The flight plan allocation system 120 includes a four-dimensional (4D) trajectory flight plan manager 200. The 4D trajectory flight plan manager 200 determines the optimum departure time slot for an aircraft, as discussed in further detail below. The 4D trajectory flight plan manager 200 may be executed by the processor 122 and memory 124. The 4D trajectory flight plan manager 200 is connected to the communication system 126 of the flight plan allocation system 120 via a communications bus and receives flight plan input data, flight time slot allocation predetermined frequency or specific time slots from the client device 110. The flight plan input data includes, for example, an origin airport, a destination airport, an aircraft type, a date of the flight, a departure time, and a takeoff weight.

The flight plan allocation system 120 includes a flight plan generator 205. The flight plan generator 205 may be implemented by the same processor as the 4D trajectory flight plan manager 200, may have a processor dedicated to itself, or may be shared by one or more other components of the flight plan allocation system 120, as discussed herein. The flight plan generator 205 generates a flight plan based upon the flight plan input data. The flight plan includes four dimensional data, including three-dimensional position data for a flight path and a time that will be used as a base for the multiple time slot allocations and surface delay predictions, as discussed in further detail below.

In one embodiment, for example, the flight plan allocation system 120 further includes a time slot allocator 210. The time slot allocator 210 may be implemented by the same processor as the 4D trajectory flight plan manager 200, may have a processor dedicated to itself, or may be shared by one or more other components of the flight plan allocation system 120, as discussed herein. The time slot allocator 210 provides multiple possible departure time slots for the given flight plan generated by the flight plan generator 205. The frequency of times slots and the upper and lower limits of a number of the time slots can be configured by a user. For example, the frequency of the time slots may be every five minutes for fifteen minutes before the proposed departure time and twenty minutes after the proposed departure time. In another embodiment, for example, the user of the client device 110 can submit time slots with the other flight plan input data.

The flight plan allocation system 120 further includes a traffic predictor 215. The traffic predictor 215 may be implemented by the same processor as the 4D trajectory flight plan manager 200, may have a processor dedicated to itself, or may be shared by one or more other components of the flight plan allocation system 120, as discussed herein. The traffic predictor 215 predicts traffic for each time slot based upon navigation data 220 and scheduled flight plan and real time position data for other aircraft 225 stored in the memory 124. In other words, the traffic predictor 215 determines how many other aircraft will be near the aircraft during all phases of the flight which could cause delays for the aircraft. As discussed in further below, for each time slot, the time slot allocator will interact with traffic predictor to get a traffic density value for the time slot by using a traffic count, merging points (e.g., departure & destination airport) and an associated bounding area for all the fixes (also known as waypoints) in the flight plan. Traffic for the terminal area fixes up to a merging point may be given a higher weightage compared to the other fixes. Based on the computed traffic density values, time slots with lesser traffic density values will be selected. The navigation data 220 is used to generate the 4D trajectory flight path. The navigation data may be received from state aeronautical information publication (AIP) data, navigation data aggregators, or the like. The scheduled flight plan and real time position data for other aircraft 225 may be retrieved from flight data sources such as System Wide Information Management (SWIM), Flightaware or any other flight data aggregators.

For all these selected time slots, weather forecast data 230 and aircraft performance data 235 stored in the memory 124 are considered by a trip fuel and time estimator 250 to calculate trip time and fuel. The estimated trip time and fuel values are provided to the 4D trajectory flight plan manager 200. The weather forecast data for the requested fix specific time may be retrieved from weather data source such as the National Weather Service(NWS), Weather Services International (WSI), or the like. The aircraft performance data for the aircraft may be retrieved from aircraft manufacturer or aircraft owner.

The flight plan allocation system 120 further includes a surface delay predictor 240. The surface delay predictor 240 may be implemented by the same processor as the 4D trajectory flight plan manager 200, may have a processor dedicated to itself, or may be shared by one or more other components of the flight plan allocation system 120, as discussed herein. The surface delay predictor 240 determines the surface delay (i.e., taxi time) at the departure airport and the arrival airport. These delays maybe attributed to large queues at airports, late arrivals, missed takeoffs and weather conditions. An aircraft is put into a waiting queue if it has missed its deadline time of departure. This results in unwanted burning of fuel. In addition flights also incur delays during arrival due to traffic, missed approaches and bad weather conditions. As discussed in further detail below, the surface delay predictor 240 takes into account data from, for example, surface operation position data 245, the weather forecast data 230 and scheduled flight plan and real time position data for other aircraft 225 stored in the memory 124 to determine surface delay for the flight. The surface operation position data 245 is from SWIM ASDEX (Airport Surface Detection Equipment, Model X) data, flightaware surface operational data, datalink or the like.

Figure 3:
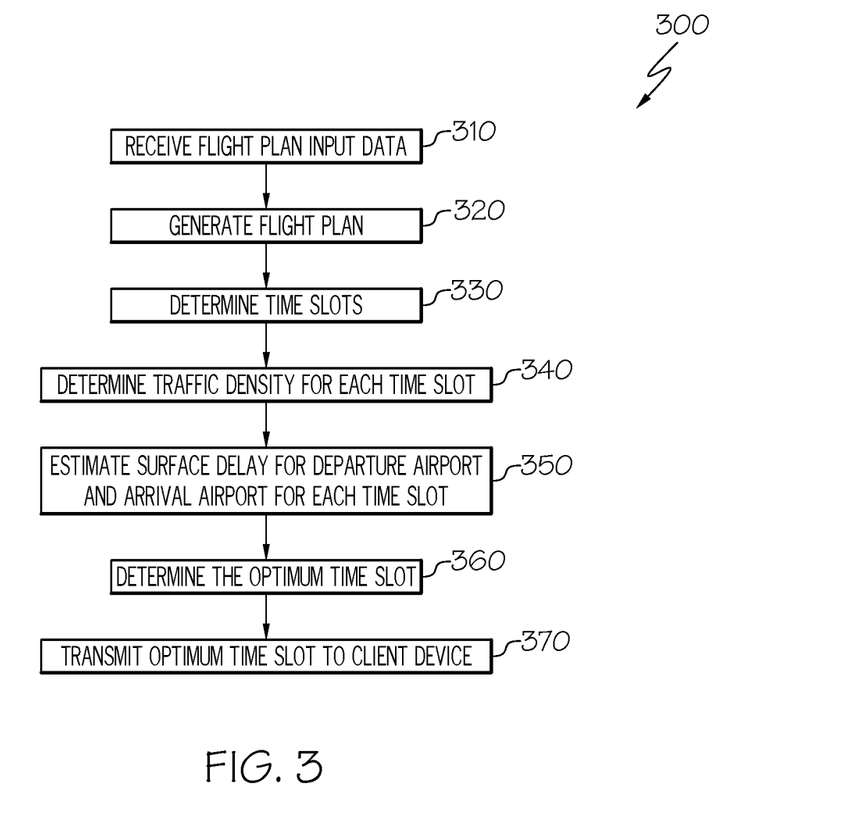
FIG. 3 is a flow diagram illustrating an exemplary method for operating the system for determining an efficient time slot for an aircraft, in accordance with an embodiment

FIG. 3 is a flow diagram illustrating an exemplary method 300 for operating the system 100 for determining an efficient time slot for an aircraft, in accordance with an embodiment. The 4D trajectory flight plan manager 200 first receives flight plan input data from the client device 110. (Step 310). As discussed above, the flight plan input data may include, for example, an origin airport, a destination airport, an aircraft type, a date of the flight, a departure time, and a takeoff weight.

The flight plan generator 205 generates a flight plan based upon the flight plan input data. (Step 320). The generated flight plan includes, for example, departure and destination airports, estimated departure date and time, flight level, flight path fixes, aircraft type, takeoff weight, and the like.

The time slot allocator 210 may then determine multiple possible time slots for the flight. (Step 330). As discussed above, the number of possible time slots, the length in time between the time slots, the number of time slots before the departure time and the number of time slots after the departure time can vary. For example, the time slot allocator 210 may choose five time slots for further analysis, each separated by ten minutes, with the middle time slot being selected as the departure time received from the client device 110. As discussed above, the time slots could also be received from the client device 110.

The traffic predictor 215 then determines a traffic density for each of the time slots. (Step 340). The traffic predictor 215 follows time based flow management to predict the traffic. This is done by scheduling the time at which other aircraft are around an area of a predetermined reference fix (i.e., waypoint) in the flight plan for the target aircraft for each fix in the flight plan generated by the flight plan generator 205 for each of the time slots. One or more of these fixes can be a merging point of multiple aircraft. A merging point is the intersection of multiple trajectory paths of multiple aircraft. Typical merging points may be, for example, an initial approach fix (IAF) point in the vicinity of a congested airport. Identification of these reference fixes for the aircraft of interest as well as other aircraft, traffic merging points, and traffic predictions are made based on current flight plan data, scheduled flight plan information and real time flight track information stored in the memory 124. The scheduled flight plan consists of air traffic control cleared flight plans and this data is available from, for example, Airborne Situational Display for Industry (ASDI) data provided by the Federal Aviation Administration (FAA).

Figure 4:
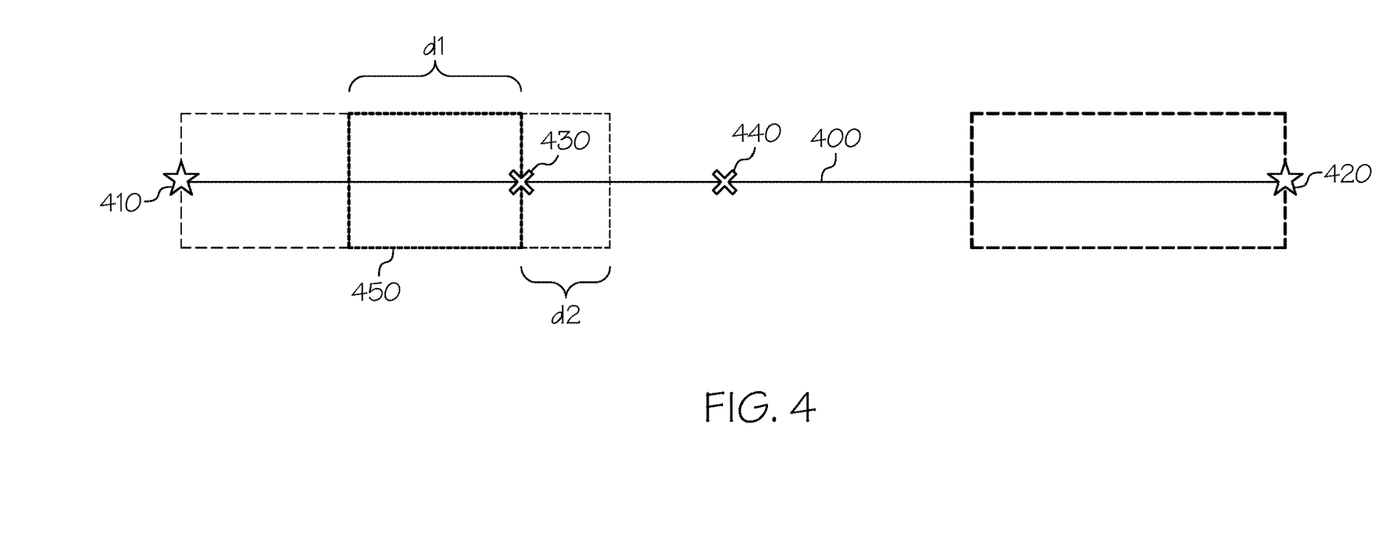
FIG. 4 illustrates an exemplary flight plan, in accordance with an embodiment.

The traffic density for each time slot is determined based upon a number of aircraft within a bounding area around each fix in the generated flight plan. FIG. 4 illustrates an exemplary flight plan 400. The origin (i.e. departure airport) of the flight plan 400 is indicated by point 410. The destination (i.e., arrival airport) of the flight plan is indicated by point 420. In this exemplary illustration, there are two fixes along the flight plan, fix 430 and fix 440.

In this example, a bounding area 450 has been generated by the traffic predictor 215 around the fix 430. While illustrated in a two-dimensional fashion, the bounding area 450 is a three dimensional area. The bounding area 450 may be, for example, a box, hyperrectangle, a cylinder, a sphere, an ellipsoid, a prism, a cone or any other polyhedron. The traffic predictor 215 determines a size and shape of a bounding area around each fix. In one embodiment, for example, the size of the bounding area may be based upon a distance between the current fix and the previous fix and a distance between the current fix and a next fix. For example, a distance d1 along an edge of the bounding area 450 may be defined to be one half the distance between the current fix, in this example fix 430, and a previous fix, in this example the origin 410. Likewise, in this example, the distance d2 along the same edge of the bounding area 450 is defined to be one half the distance from the current fix, fix 430 in this example, and the next fix, fix 440 in this example. In case of a trajectory course change, any overlap or gap area formed between the two half bounding boxes are taken into consideration for the particular current fix. For the origin airport fix 410 one half of the distance d1 is set to equal to zero and another half of the distance d2 will be calculated, because there is no previous fix exist for departure (origin) airport fix 410. Similarly for destination airport fix 420 one half of the distance d1 will be calculated and another half of the distance d2 is equal to zero, because there is no next fix exist for destination airport fix 420. In one embodiment, for example, the bounding box may be two-dimensional. However, three dimensional bounding boxes could be used. In case of three-dimensional bounding boxes, the equations one the area becomes the volume of the bounding box not the area. Then height or elevation of the bounding box may change with respect to the flight phase. In other words, a terminal area bounding box may have a different elevation than an en route bounding area.

Figure 5:
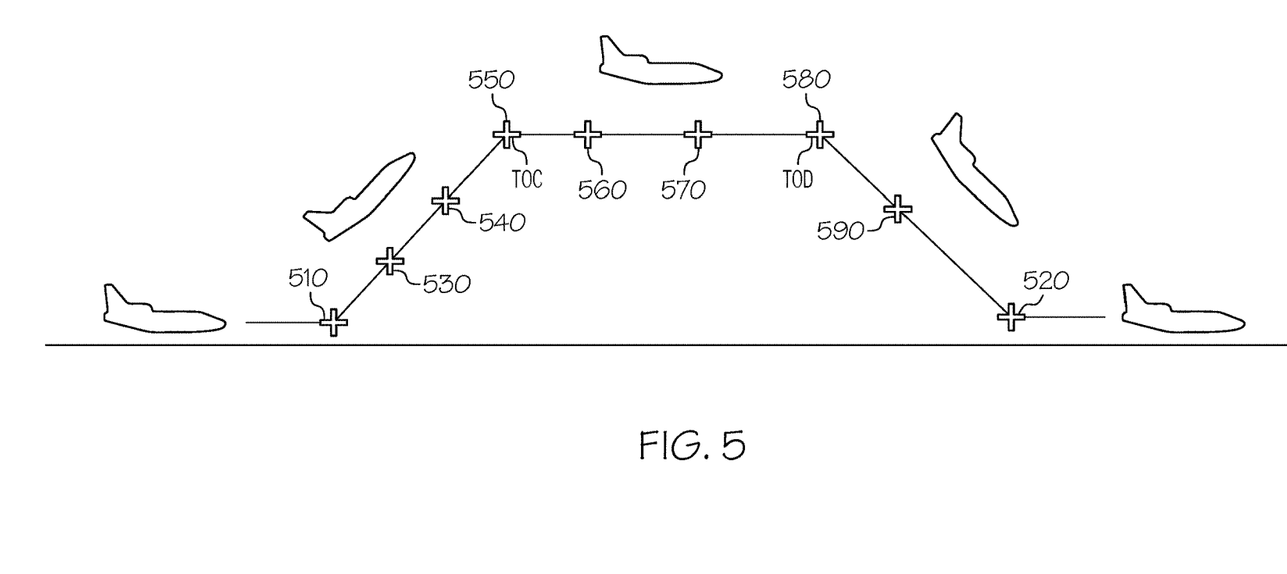
FIG. 5 illustrates another exemplary flight plan, in accordance with an embodiment.

In addition to fixes along the flight path, bounding areas around the departure airport and around the destination airport are determined. FIG. 5 illustrates an exemplary flight plan 500 in accordance with an embodiment. As seen in FIG. 5, the flight plan includes an origin (departure airport) 510 and a destination (arrival airport) 520. The flight plan further includes fixes 530, 540, 550, 560, 570, 580 and 590. Fixes 530, 540 and 550 are fixes between the origin 510 and the top of climb, which is located at fix 550. Fixes 560 and 570 are fixes along the flight path at a cruising altitude. Fixes 580 and 590 are located between the top of decent (i.e., the location where the aircraft begins its decent) until the destination 520. Bounding boxes for each of the fixes from departure airport to destination airport 510, 520 and 530-590 may be determined in a similar fashion as discussed above.

Once the traffic predictor 215 defines the bounding area for each fix along the flight plan, the traffic predictor 215 determines a traffic count which is the number of aircraft, including the target aircraft, which are scheduled to be within the bounding area at the same time that the target aircraft (i.e., the aircraft for which the analysis is being performed) is in the bounding area. The traffic predictor 215 determines which other aircraft are scheduled to be within the bounding area at the same time as the target aircraft based upon the scheduled flight plan and real time position data for other aircraft 225 stored in the memory 124.

Figure 6:
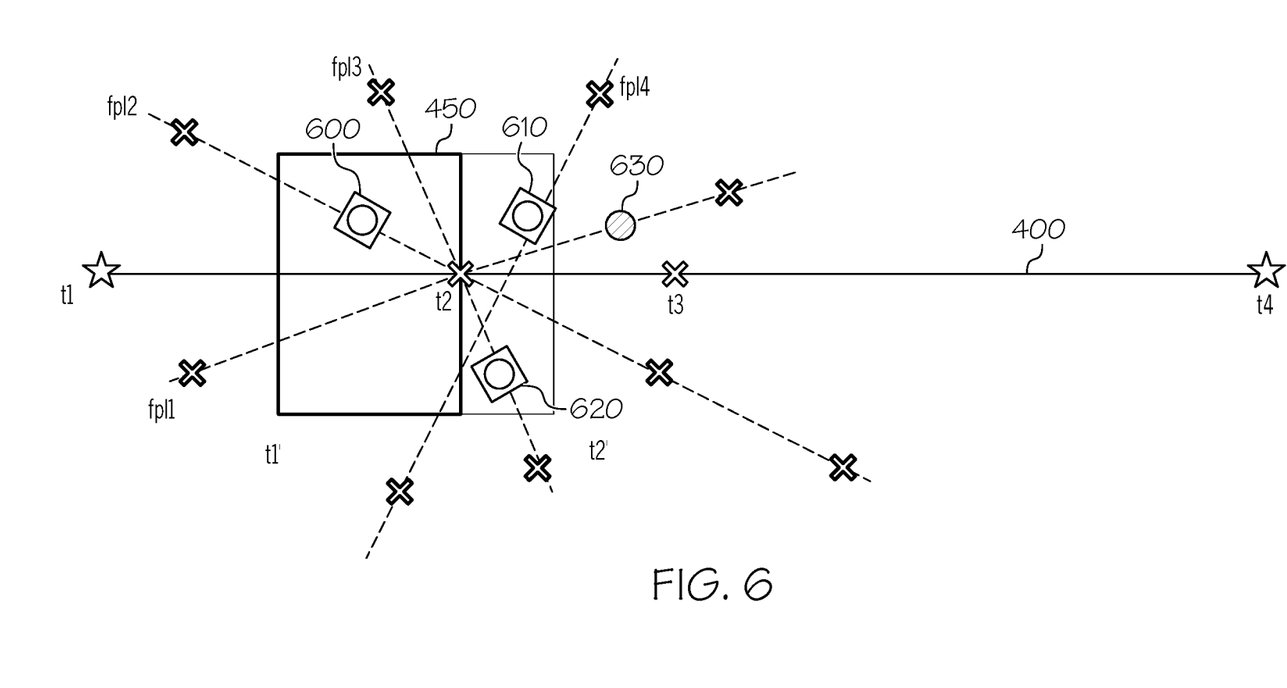
FIG. 6 illustrates the flight plan and bounding area illustrated in FIG. 4, in accordance with an embodiment.

FIG. 6 illustrates the flight plan 400 and bounding area 450 illustrated in FIG. 4. As seen in FIG. 6, three aircraft 600, 610 and 620 are scheduled, based upon their respective flight plan data or their actual real time position data, to be in the bounding area 450 when the target aircraft is at the fix location. The bounding box area 450 has a time range calculated based on the current fix time. The traffic predictor 215 calculates the bounding box area 450 start time t1' and end time t2', which are used to identify the number of aircraft which are passing through the bounding box area. Accordingly, the traffic predictor 215 determines the number of aircraft which are estimated to be within inside the bounding box area 450 when the target aircraft is at the respective fix. A fourth aircraft 630 is scheduled to be within the vicinity of the bounding area 450, but is not within the bounding area at the current fix 420 time stamp, and is thusly not considered in the density calculations.

The traffic density for a bounding area for each fix is calculated according to Equation 1:

$$D_f = \frac{(T_f * W_f)}{A_f}$$

Where $D_f$ is the density of the bounding area corresponding to a fix f, T is the traffic count for the bounding area corresponding to the fix f, $W_f$ is a weightage applied to the bounding area corresponding to the fix and A is an area of the bounding box around the respective fix f.

The weight $W_f$ applied to each fix may vary depending upon the location of the fix. One fix closer to the origin and one fix close to the destination may be a merging point for the respective airport. The merging point is the location where aircraft travelling from different directions merge together as the aircraft begin to line up to land or begin to diverge as they travel to different destinations. For the origin airport, the fix with maximum traffic count from departure airport to till the top of climb will be considered to identify the merge point for departure airport. If more than one fix has an identical and maximum traffic count through the top of climb, then the fix which is farthest from departure airport will be considered as departure merging point. For the destination airport, the fix with maximum traffic count from top of to the destination airport will be considered to identify the merge point for destination airport. If more than one fix has the same and maximum traffic count, then the fix which is farthest from destination airport will be considered as the destination merging point.

The weight $W_f$ is applied to each fix according to a linear weightage model. The linear weight model is a process of assigning a higher weight (it could be multiplication factor of any one value like 2,3,4 . . . compared to other fixes) to each fix from the departure airport fix to the departure airport merging point (fix) and from arrival merging point (fix) to the arrival airport fix. Using FIG. 5 as an example, 530, 540 and 550 are the fixes from departure airport 510 to the departure merging point. In one embodiment, for example, a weightage factor value as two may be assigned to the fixes 510, 530, 540 and 550, a weightage factor of one may be assigned to fixes 560 and 570, and a weightage factor of two may be assigned to fixes 580 and 590 from top of descent to the destination airport 520. In this example terminal area fixes got double weightage compare to the en route fixes.

Once the time slots are predicted by the time slot allocator 210, the surface delay predictor 240 can predict the surface delay for each time slot. (Step 360). These delays may be attributed to large queues at airports, late arrivals and missed takeoff. In one embodiment, for example, the surface delay predictor may be implemented as a deep neural network to predict the taxi time using input parameters such as number of arrivals, number of departures, number of aircraft ground positions (gate out and not wheels off, wheels on and not gate in), and weather conditions such as visibility, ceiling, temperature, precipitation or the like. The input data for the neural network may be stored in the memory 124 as discussed above. A deep neural network model may be built individually for each airport, as each airport may react differently to the same conditions. For example, an airport which typically encounters snow would typically have fewer delays during a snow storm that an airport which atypically encounters snow. Deep neural networks employ machine learning. Accordingly, the surface delay predictor 240 can more accurately predict surface delay for any given airport more accurately over time.

Below is an example of a deep neural network neuralnet function to train the neural network model for taxi time prediction in the R programming language: NeuralNetworkModel←neuralnet(taxi_time_prediction~#arrival+#departure+#groundPos+#Wx_Visibility+#Wx_Ceiling+#Wx_Temparature+#Wx_Precipitation, OOOI_Data,hidden=c(7, 3),threshold=0.01)

Where neuralnet is the DNN function is available in the R programming language neuralnet package, taxi_time_prediction is the response variable, #arrival is the number of arrivals for the given airport, #departure is the number of departures for the given airport, groundPos is the number aircraft ground positions for the given airport, weather condition–Wx_Visibility, Wx_Ceiling, Wx_Temperature, Wx_Precipitation for the given airport, OOOI_data is the surface operation position data (OOOI stands for gate Out wheels Off wheels On gate In)

The neural network model is built for the departure airport as well for the arrival airport. The departure airport model is built based on the number of departures, arrivals, weather condition (Visibility, Ceiling, Temperature and Precipitation) and aircraft ground positions for the departure airport using the OOOI data and weather data of the departure airport. Likewise, the arrival airport model is built based on the number of departures, arrivals, weather condition and aircraft ground positions for the arrival airport using the OOOI data and weather data of the arrival airport.

For the given flight plan time slot, the departure airport built model may be used to predict the taxi out time based on the estimated departures and arrivals for the given time slot (these values are estimated based on the scheduled flight plan and real time position data of the departure airport) as well as the estimated aircraft ground positions (this value is derived based on the estimated departures and arrivals) and weather condition (Visibility, Ceiling, Temperature and Precipitation).

For the given flight plan slot time, the arrival airport built model may be used to predict the taxi in time based on the estimated departures and arrivals for the given time slot (these values are estimated based on the scheduled flight plan and real time position data of the arrival airport) as well as the estimated aircraft ground positions (this value is derived based on the estimated departures and arrivals) and weather condition (Visibility, Ceiling, Temperature and Precipitation).

The 4D trajectory flight plan manager 200 then selects the optimum time slot for the flight. (Step 370). In on embodiment, for example, the 4D trajectory flight plan manager 200 may utilize a weighted summation of scaled score values to determine the optimum time slot. In this embodiment, the traffic density calculated by the traffic predictor 215 for each time slot and the taxi in and taxi out times for each time slot calculated by the surface delay predictor 240 are scaled such that they are expressed in the same units. The scaled values may then be weighed to prioritize one or more of the categories. In other words, the scaled values may be multiplied by a prioritization factor such that one or more of the scaled values counts more towards the weighted summation than the other one or more values.

The scaled value may be determined for each of the traffic density, taxi in and taxi out times according to Equation 2:

$$V_S = (V - P\min)/(P\max - P\min)$$

Where $V_S$ is the scaled value and V is the traffic density (i.e., traffic count per square miles), or taxi in or taxi out time in seconds, minutes or the like. Pmin and Pmax represent the maximum and minimum values of V data set range.

The scaled value is converted into a scored value according to Equation 3:

$$S = 1 V_S$$

Where S is the scored value. The scored value gives a ranking to each value. By doing the scored value, the optimized value will be easily determined in a set of values. In case of taxi out time, the highest taxi time value will have a lower scaled score value. So this will have lowest weighted score value. The lowest taxi time value will have the highest scaled score value, so this will have highest weighted score value.

The scored value S is then multiplied by the weight assigned to the respective traffic density, taxi in time and taxi out time.

The 4D trajectory flight plan manager 200 then sums the scaled, scored and weighted value for the traffic density, taxi in time and taxi out time for each time slot. The resultant time slot with the highest value is then chosen as the optimum time slot. Accordingly, by accurately determining predicted traffic densities as well as surface delays for each time slot, the 4D trajectory flight plan manager 200 can more accurately predict an optimum departure time for the aircraft to minimize delays and save fuel. Minimizing delays reduces fuel waste and improves the customers overall experience with the flight.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for determining an optimum flight time slot for a target aircraft, comprising:
   a communication system;
   a processor communicatively connected to the communication system, the processor configured to:
   receive scheduled flight plan data and real time position data for other aircraft;
   receive surface operation position data for other aircraft and ground operation vehicles at a departure airport of the target aircraft and surface operation position data for other aircraft and ground operation vehicles at an arrival airport of the target aircraft;
   receive weather forecast data;
   receive a proposed flight time;
   determine a flight plan for the target aircraft;
   determine a plurality of flight time slots for the target aircraft based upon the proposed flight time;
   determine, for each of the plurality of flight times slots, an estimated traffic density for the respective time slot based upon a number of aircraft expected to be within a first bounding area defined by an area around a first merging point near the departure airport according to the received flight plan data and real time position data and a first weight assigned to the first merging point, and a number of aircraft expected to be within a second bounding area defined by an area around a second merging point near the arrival airport according to the received flight plan data and real time position data and a second weight assigned to the second merging point; and
   determine an optimal one of the plurality of flight time slots based upon the determined traffic density for each of the plurality of time slots.

2. The system according to claim 1, wherein the processor is further configured to:
   determine, for each of the plurality of flight time slots, an estimated taxi time for the departure airport based upon the received surface operation position data for other aircraft and ground operation vehicles at the departure airport of the target aircraft.

3. The system according to claim 2, wherein the processor is further configured to:
   determine, for each of the plurality of flight time slots, an estimated taxi time for the arrival airport based upon the estimated arrival time slot for the respective plurality of flight time slots and the received surface operation position data for other aircraft and ground operation vehicles at an arrival airport of the target aircraft.

4. The system according to claim 3, wherein the processor is further configured to determine an optimal one of the plurality of flight time slots based upon a weighted summation of the determined traffic density, the estimated taxi time for the departure airport and the estimated taxi time for the arrival airport for each respective one the plurality of flight time slots.

5. The system according to claim 4, wherein the processor is further configured to:
   determine a traffic density for each fix along the determined flight plan, wherein the determined traffic density of the respective time slot is based upon a weighted summation of the traffic density for each fix along the determined flight plan.

6. The system according to claim 5, wherein the first bounding area contains a first fix and the second bounding area contains a second fix and a first weight is applied to a traffic density corresponding to the first fix and a second weight is applied to a traffic density corresponding to the second fix.

7. The system according to claim 6, wherein the traffic density for each fix is calculated according to:

$$D_f = \frac{(T_f * W_f)}{A_f}$$

where $D_f$ is the density of a corresponding fix f, T is the traffic count for the corresponding fix f, $W_f$ is a weightage applied to the corresponding fix and A is an area of the bounding box around the corresponding fix f.

8. The system according to claim 7, wherein each bounding area for each fix is sized based upon a distance between the respective fix, a previous fix and a next fix along the determined flight plan.

9. The system according to claim 1, wherein the processor is further configured to determine the plurality of time slots based upon a predetermined frequency.

10. The system according to claim 1, wherein the processor is further configured to determine the plurality of time slots based upon input from a client device.

11. A method for determining an optimum flight slot for a flight of an aircraft, comprising:
receiving, by a processor, flight plan input data from a client device;
generating, by the processor, a flight plan based upon the flight plan input data, the flight plan including a plurality of fixes along the flight plan;
determining, by the processor, a plurality of time slots based upon the flight plan input data;
determining, by the processor, a traffic density for each fix along the flight plan for each of the plurality of slots, the traffic density based upon a number of aircraft within a bounding area containing each respective fix;
determining, by the processor, the optimum flight time slot from the plurality of time slots based upon a weighted summation of the traffic density for each fix along the flight plan for each of the plurality of slots; and
transmitting, by the processor, the optimum flight time slot to the client device.

12. The method of claim 11, further comprising:
determining an estimated surface delay for a departure airport and an arrival airport for each of the plurality of time slots, wherein the optimum time slot is based upon the weighted summation of the traffic densities and the estimated surface delay for the departure airport and the arrival airport.

13. The method of claim 12, where one of the plurality of fixes including a merging point for the departure airport and one of the plurality of fixes including a merging point for the arrival airport are weighted higher than the other plurality of fixes along the flight plan.

14. The method of claim 11, wherein the traffic density for each fix is determined according to:

$$D_f = \frac{(T_f * W_f)}{A_f}$$

where $D_f$ is the density of a corresponding fix f, T is the traffic count for the corresponding fix f, $W_f$ is a weightage applied to the corresponding fix and A is an area of the bounding box around the corresponding fix f.

15. The method of claim 11, wherein the plurality of time slots are selected at a predetermined frequency.

16. The method of claim 11, wherein each bounding area for each fix is sized based upon a distance between the respective fix, a previous fix and a next fix along the determined flight plan.

* * * * *